INVENTORS
JAMES C. ALBRIGHT
EARL W. SUTTON
DONALD J. TIMKO
BRUCE F. BOHOR

ATTORNEY

INVENTORS
JAMES C. ALBRIGHT
EARL W. SUTTON
DONALD J. TIMKO
BRUCE F. BOHOR

BY William J. Miller
ATTORNEY

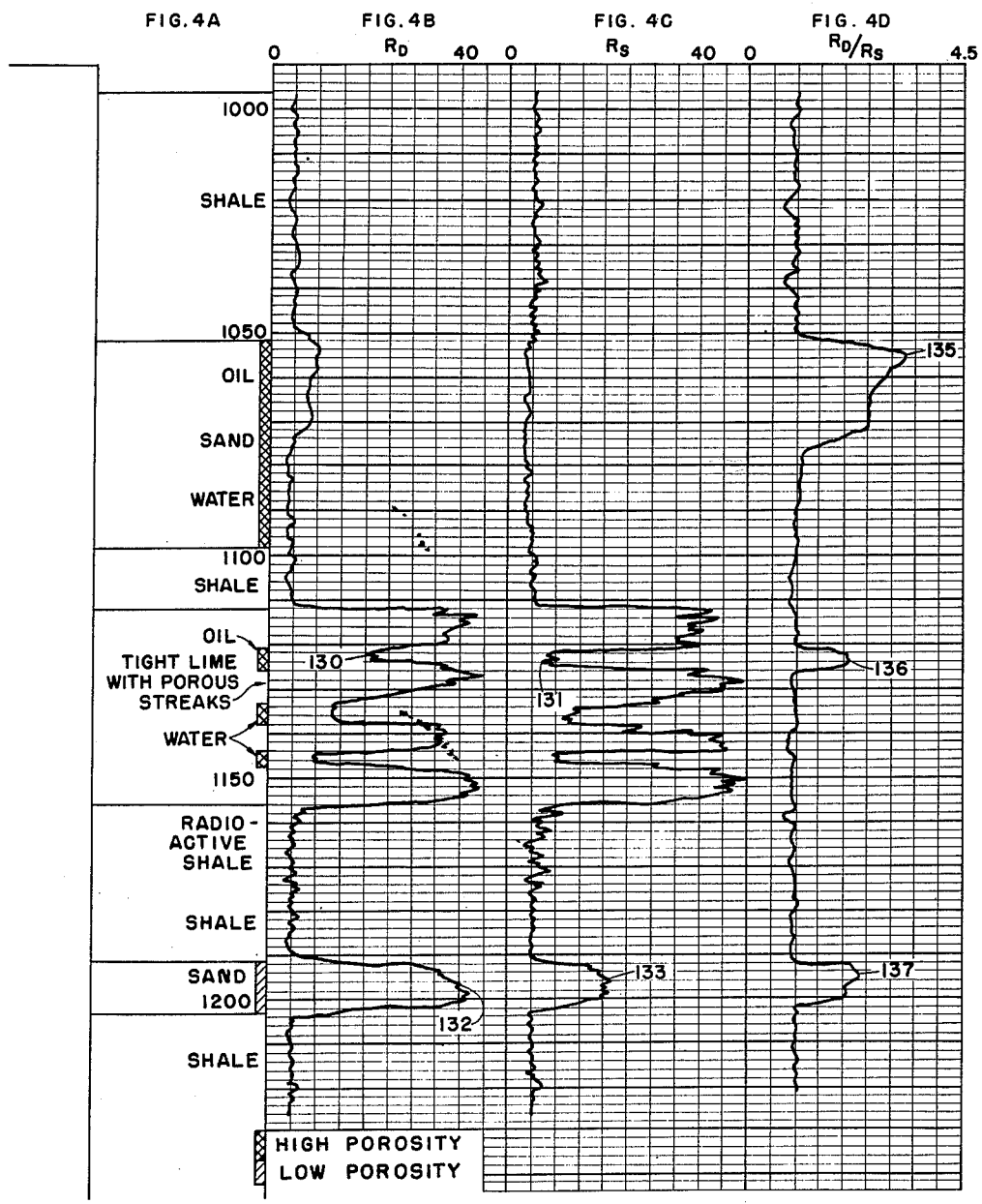

United States Patent Office 3,075,142
Patented Jan. 22, 1963

3,075,142
ELECTRICAL WELL LOGGING DEVICE
James C. Albright and Earl W. Sutton, Ponca City, Okla., Donald J. Timko, Houston, Tex., and Bruce F. Bohor, Ponca City, Okla., assignors to Continental Oil Company, Ponca City, Okla., a corporation of Delaware
Filed Feb. 26, 1960, Ser. No. 11,197
7 Claims. (Cl. 324—1)

This device relates generally to an improved well logging device, and in particular to a method and apparatus which may be used to determine the nature of subsurface geological structures by the exploration of instersecting strata within a borehole.

It is often customary in the drilling of oil wells to investigate geological formations that have been pierced by the borehole. The information thus received may prove valuable for the completion of the well. The method of investigation is generally accomplished by logging the well-bore, using electrical measurements which are received from many well known types of logs or sondes. A conventional electrical log may, for example, consist of a measurement of the well-bore self potential variations at different depths. In addition, several resistivity curves may be run using a pad-type electrode system or a non-pad-type focused resistivity log which investigates borehole conditions near to or at a distance from the logging sondes. Present practice is to perform the survey using the pad-type log and non-pad-type focusing resistivity logs separately and to later correlate the data obtained with the measured depth. This practice, however, has two notable disadvantages. First a considerable amount of time is required to run two separate surveys in the borehole. Second, stretching of the logging cable and possible slippage of the depth counter mechanism renders precise correlation of depth between the separately run logs difficult or impossible. Further, accurate correlation becomes almost impossible since the received signal is extremely complex in both its amplitude and phase relationship, thus, any error in amplitude of the return signal from the sondes would tend to obscure rather than clarify the signal.

This invention features a method of recording a plurality of received voltages of a plurality of simultaneously operated electrical logging sondes, comprising receiving a first and second signal from a first sonde, said first and second signals corresponding to the received voltages and transmitted currents respectively, forming a first ratio from the ratio of said first and second voltages, receiving third and fourth voltages, said third and fourth voltages corresponding to the received voltage and transmitted current of a second sonde respectively, forming a second ratio voltage corresponding to the ratio of said third and fourth voltages, adjusting the time synchronism of said first and second ratio voltages in correspondence to the difference in depth of said first and second sondes, forming a third ratio voltage by obtaining a ratio of said first and second ratio voltages and recording said third ratio voltage in time synchronism with the position of said sondes.

This invention further features a method of electrically logging a borehole comprising, forming a single composite sonde from a plurality of individual sondes, lowering said newly formed sonde into a borehole, transmitting from each of said sondes a distinctive signal, receiving at a remote location said transmitted distinctive signal, communicating said received signals to the surface of said borehole, individually recording each of said received distinctive signals.

Therefore, it is an object of this invention to provide a method which permits exact correlation between various types of logging equipment.

It is a further object of this invention to combine many of the existing logs into a compact sonde, thus, substantially reducing the time required to perform the logging operation.

It is still another object of this invention to provide a log wherein the results may be easily interpreted by one only slightly skilled in the art.

It is still another object of this invention to provide a practical method of insuring precise depth correlation between the three-electrode non-pad focused logging tool or sonde, a pad-type focused logging tool or sonde, a self-potential measuring logging tool or sonde and a well-bore caliper.

It is another object of this invention to provide a novel method of correlating data obtained from the three-electrode non-pad focused sonde and a pad-type focused sonde, such that possible oil bearing formations will be readily observable.

It is a further object of this invention to provide a method for simultaneously operating many types of well known logs without creating measurable interferences between any of the logs.

In permeable formations, the hydrocarbon saturation can frequently be determined from information obtained from a three-electrode non-pad focused sonde and a pad-type focused sonde. The non-pad-type focused sonde provides information concerning the geological strata a distance from the sonde while the pad-type focused sonde provides information in the close vicinity of the pad. A ratio of the two curves obtained from these two logging tools will provide valuable information as to the possibility of permeable formations containing hydrocarbon products. The water saturation of a permeable formation is an important factor in the determination of the formation resistance. The formula for water saturation for a clean formation is given by:

$$S_w = (1 - RHS)\sqrt{\frac{R_i}{R_t} \frac{R_w}{R_{mf}}}$$

where:

$S_w$ = water saturation is assumed to be equal to one minus the hydrocarbon saturation.
$RHS$ = residual hydrocarbon saturation, usually 10–30% for oil or gas zones.
$R_i$ = electrical resistivity of the invaded zone near the bore hole.
$R_t$ = electrical resistivity of the uninvaded formation.
$R_w$ = electrical resistivity of the formation water. This usually has only a minor gradual variation with depth.
$R_{mf}$ = electrical resistivity of the mud filtrate. It has a slow, uniform variation with depth due to temperature effects.

This type of array (3-electrode, non-pad, focused and pad-type focused) is usually run in wells which have been drilled with muds having filtrate electrical resistivities ($R_{mf}$) of the same magnitude as the formation water resistivity ($R_w$), so that the ratio $R_w/R_{mf}$ is usually approximately equal to one.

All the factors are usually constant over a given interval in a given well except $R_i/R_t$. Under proper conditions of invasion $R_i/R_t$ is equal to, or approximately equal to, the ratio of the pad-type focused log to the three-electrode non-pad focused log. Therefore, a log of either this ratio or its reciprocal would be a great aid to the determination of saturation.

Further objects, features, and advantages of the invention will become apparent from the following description and claims when read in view of the accompanying drawings, in which:

FIGURE 4a is a chart of possible substrata in a bore hole.

FIGURE 4b is a resistivity ($R_t$) chart of a three-element focused sonde for the substrata shown in FIGURE 4a.

FIGURE 4c is a resistivity ($R_1$) chart of a pad-type focused sonde for the substrata shown in FIGURE 4a.

FIGURE 4d is a resistivity chart of $R_t/R_1$.

Figure 1:
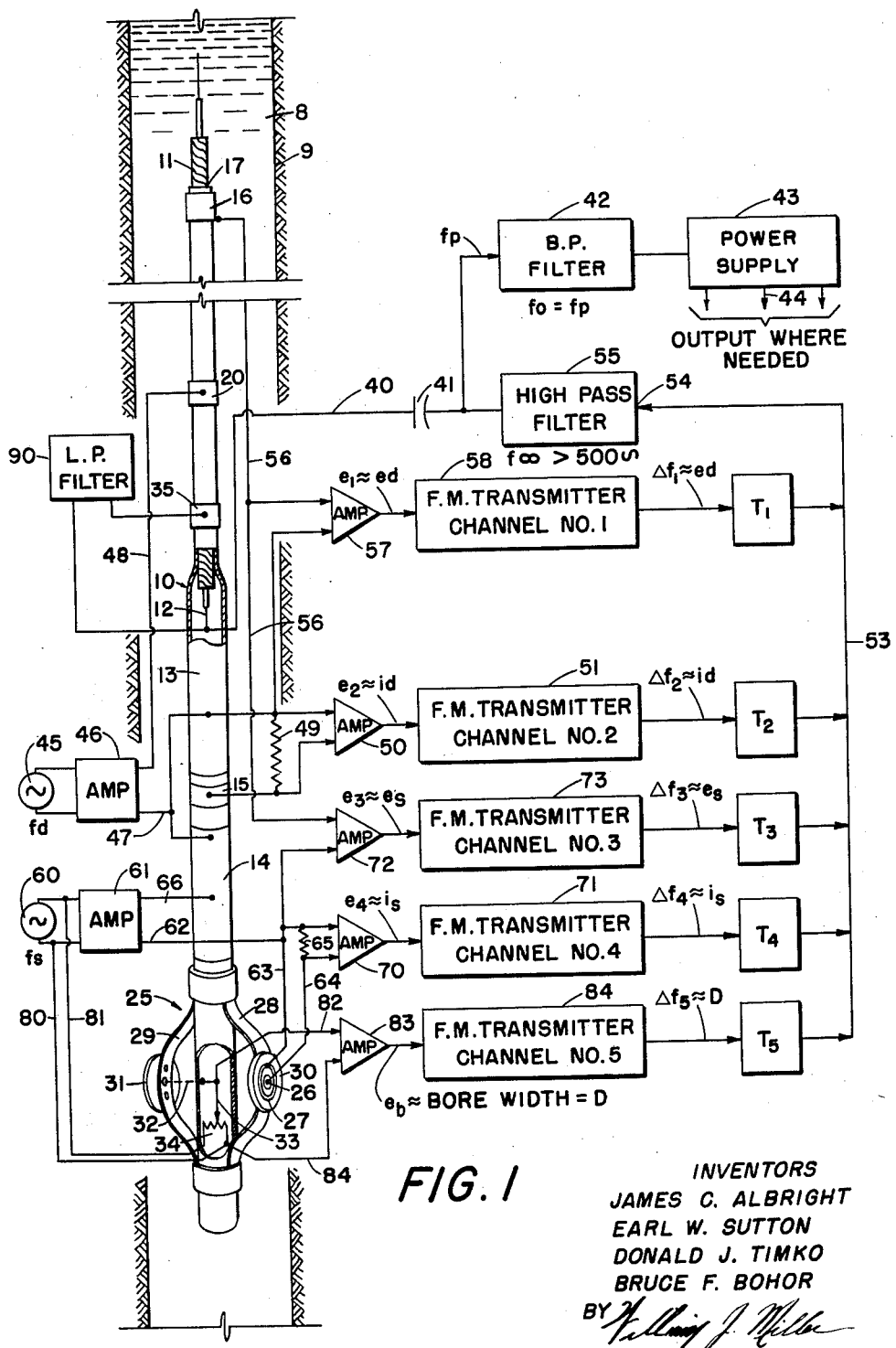
FIGURE 1 is a drawing of the down-hole equipment showing the sonde and its associated circuity.

Referring to FIGURE 1, a novel sonde 10 is supported at its upper most extreme by a cable 11 which has a center conductor 12. The upper portion of the sonde contains a three-electrode non-pad focused electrical array or sonde, which is composed of an upper focusing electrode 13, a lower focusing electrode 14, and an exploratory electrode 15. A remote pickup 16 for the non-pad focused sonde is attached to cable 11 and insulated from the cable by an insulating means 17. An electrode 20 also insulated by means 17 provides the return path for the non-pad focused sonde.

A pad-type focused sonde 25 is connected to the lower portion of the non-pad focused sonde. A pair of arms 28 and 29 supports a pair of pads 30 and 31, respectively. Pad 30 contains a pair of electrodes 26 and 27, electrode 26 forms the exploring electrode and electrode 27 forms the focusing electrode. The arm 29 and pad 31 function as a caliper assembly. The movement of the caliper assembly is communicated from a mechanical linkage 32 to a potentiometer arm 33 of a potentiometer 34. The return path to amplifier 61 is provided by an electrode 14. Remote electrode 16 likewise furnishes the reference voltage for the pad-type sonde also insulated by insulating means 17. In normal use, an example of the electrode spacings on the cable from the top of the sonde may be 20 feet for electrode 35, 50 feet for electrode 20, and 100 feet for electrode 16. As was previously explained, the S.P. electrical array, the three-electrode non-pad focused electrical array, and the pad-type focused electrical array may all be operated simultaneously by a novel method of isolating each of the voltages transmitted by each of the sondes in cooperation with a novel method of isolating their respective pickup voltages such that any interference between the various types of logging equipment will be entirely eliminated, or very substantially reduced.

Isolation may be performed in several ways. One method could be performed by sequentially operating each of the sondes at a high enough repetition rate that a substantially continuous log will be formed. The second method, and preferred embodiment of this invention, operates each of the sondes at a selected frequency. This, of course, requires that each of the sondes will transmit into the ground at a preselected frequency, a voltage of sufficient amplitude for adequate penetration of the substrata which is being investigated. The preferred embodiment requires also that the received signals actuate a selective transmitting device capable of communicating with the recording equipment at the surface of the bore hole.

Referring to the specific equipment used in the preferred embodiment shown in FIGURE 1, conductor 12 is connected through a conductor 40, and an isolation capacitor 41 to a band pass filter 42. Band pass filter 42 is connected to a power supply 43. A plurality of outputs such as 44 from power supply 43 is connected where required in the remaining circuit to energize the various amplifiers, transmitters, and generators. The three-electrode non-pad focused sonde is energized by a generator 45 which is connected to an amplifier 46. The output of amplifier 46 is connected by a wire 47 to the focusing electrodes 13 and 14. The return to the amplifier is connected from electrode 20 through a wire 48. The frequency, $f_d$, of the output voltage from generator 45 may be any preselected frequency, however, for our particular embodiment, a frequency of 300 cycles was selected. Electrode 15 is connected to its source of voltage through a resistor 49. The current $I_d$ through resistor 49 is measured by connecting an amplifier 50 across resistor 49. The output voltage from amplifier 50 is then applied to a frequency modulated transmitter 51. The output from transmitter 51 is applied to a matching means such as transformer $T_2$, through a wire 53 to the input 54 of a high pass filter 55. The voltage, $e_d$, for the three-electrode sonde is picked up from electrode 13 and remote electrode 16, which is connected through a wire 56, and applied to a tuned amplifier 57. The output from the amplifier is then applied to a frequency modulated transmitter 58. The output of transmitter 58 is applied through a matching means such as transformer $T_1$ to conductor 53. The three-electrode pad-type sonde is energized by a generator 60. In this preferred embodiment, generator 60 has a frequency of 400 c.p.s. The generator voltage may be further amplified by a means such as amplifier 61 if required. The output of amplifier 61 is connected through wires 62 and 63 to focusing element 27. Exploratory electrode 26 is connected through a wire 64 and a resistor 65 to a source of voltage at focusing electrode 27. Return to the amplifier 61 is through a wire 66 from electrode 14. The current $I_s$, through resistor 65 is applied to an amplifier 70. The output from amplifier 70 is applied to the input of a frequency modulated transmitter 71. The output of transmitter 71 is applied through a matching means such as a transformer $T_4$ to conductor 53. The voltage $e_s$ for the pad-type sonde is also picked up from electrode 27 and remote electrode 16, conducted to a tuned amplifier 72 through conductors 63 and 56. The output of the tuned amplifier 72 is applied to the input of transmitter 73. The output of transmitter 73 is applied through a matching means such as a transformer $T_3$ to conductor 53.

The caliper circuit uses the same source of power as pad-type sonde 25, namely generator 60. A pair of conductors 80 and 81 are connected across potentiometer 34. Potentiometer arm 33 is connected through a conductor 82 to the input of an amplifier 83. A conductor 84, likewise, is connected to the input of amplifier 83. The voltage $e_b$ developed by variation of bore width is applied from amplifier 83 to frequency modulator transmitter 84. The output of a frequency modulated transmitter 84 is applied through an isolation means such as a transformer $T_5$ to conductor 53. Self potential pickup electrode 35 is connected through a low pass filter 90 to conductor 12.

In operation, the sonde 10 is generally lowered into a bore hole 9 containing a conductive liquid 8, such as drilling mud or the like. The operation of the three individual sonde are well known to those skilled in the art. References such as Uren, "Petroleum Production Engineer," New York: Academic Press, Inc. (1954), 126 pp., and Wiley, M. R. J., "The Fundamentals of Electric Log Interpretation," New York: McGraw-Hill Book Co., Inc. (1946), 746 pp., fully explain the operation and use of the afore-mentioned sondes. The three-electrode non-pad-type focusing sonde is energized by generator 45 which has a frequency of approximately 300 c.p.s. The output of the generator is amplified by amplifier 46. It is to be understood, of course, that if generator 45 has sufficient amplitude, amplifier 46 would not be needed. The output of amplifier 46 is applied to focusing electrodes 13 and 14, and through a current measuring resistor 49 to exploratory electrode 15. Variations in current $I_d$ caused by changes in resistance $R_t$ of the earth structure in the uninvaded formation are picked up as a change in voltage $e_2$ across resistor 49. This change in voltage which is proportioned to $I_d$ is amplified and applied to frequency modulated transmitter 51 which has been arbitrarily designated as channel 2. A frequency modulation transmitter has been selected as a preferred way of converting the change in voltage to a useable output. Its advantages become evident when it is understood that the deviation in the frequency of a frequency modulated transmitter such as 51 is directly proportional to the variation in magnitude of the modulation voltage such as $e_2$. The carrier frequency of the transmitter may be set to any desired frequency, so long as it is sufficiently distant from the other channels that its deviation $\Delta f_2$ will not interfere or cause intermodulation with the remaining transmitters. The output of transmitter 51 is applied to a matching means such as transformer $T_2$ in order that the transmitter impedance will be adequately matched to the impedance of line 53.

The voltage on electrodes 13, 14, and 15, and a reference voltage from electrode 16 are applied to the input of a selective or tuned network such as amplifier 57 which is tuned to the frequency of $e_d$ (or $f_s$). Its output $E_1$ which is proportional to $e_d$ is applied to transmitter 58. Transmitter 58, likewise, has a carrier frequency which is sufficiently different from the remaining transmitters that its frequency deviation $\Delta f_1$ will not intermodulate with the remaining transmitters. It, likewise, has an impedance matching transformer $T_1$. Thus, it is evident with a single generator 45 a means has been provided using separate transmitters 58 and 51 and selective networks 57 and 50 to adequately separate the current $i_d$ and voltage $e_d$ of the three-electrode sonde such that the formation resistance $R_t$ can be recorded in a method which will be subsequentially described.

The pad-type sonde is provided with a power source having a frequency $f_s$ which is different from the generator frequency for the three-electrode sonde. A frequency which gave adequate selectivity for the pad-type sonde was 400 c.p.s. The output voltage from generator 60 is amplified in amplifier 61 and then supplied to focusing electrode 27. Excitation for the exploratory electrode 26 is applied through resistor 65 to a convenient means for measuring the transmitted signal current $I_s$. The voltage $e_4$ from amplifier 70 which is proportional to $I_s$ is supplied to frequency modulated transmitter 71, arbitrarily designated as channel 4. Transmitter 71, likewise, will have a carrier frequency sufficiently different from the remaining channels such that its output $\Delta f_4$ will not interfere with the remaining channels. Transformer $T_4$, likewise, provides a means of matching the transmitter impedance with the impedance of line 53. Since the frequency of the voltage from the exploratory electrode is different from the frequency of the voltage for the three-electrode sonde, the electrodes which are common to the three-electrode sonde may be used for a second purpose; namely, a return electrode for the pad-type sonde. Thus, electrodes 13 and 14 pick up the return current which was transmitted by electrode 26 and apply it to amplifier 61. The voltage $e_s$ of electrode 27 which is characteristic of the variation in the invaded zone in the borehole is picked up between electrode 27 and remote electrode 16 and applied to a selective network or tuned amplifier 72 which is tuned to the frequency of $f_s$. The output voltage $e_3$ from amplifier 72 which is proportional to the voltage $e_s$ of the pad-type sonde is applied to frequency modulation transmitter 73 which has been arbitrarily designated as channel 3. Channel 3, likewise, has a carrier frequency selected to provide adequate isolation from the other channels. The output frequency $\Delta f_3$ from transmitter 73 will likewise vary in proportion to pickup voltage $e_s$. Transmitter 73 will likewise vary in proportion to pickup voltage $e_s$. Transmitter 73 is likewise provided with a matching transformer $T_3$.

Since the caliper circuit does not radiate voltage into the substrata, its source of voltage may be from either the power supply generator 45 of generator 60, or from any other convenient source. In this embodiment, generator 60 was selected. The variation in well bore width is transmitted through the mechanical linkage to potentiometer 34. Thus, the output from potentiometer 34 will vary in accordance with the width of the well bore. The potentiometer output is applied to amplifier 83 and subsequentially, to frequency modulated transmitter 84. The output from the transmitter $\Delta f_5$ is applied to a matching means such as transformer $T_5$. An example of the transmitter carrier frequencies for channel 1 through channel 5 which provide adequate separation is as follows:

| | Kilocycles |
|---|---|
| Channel 1 | 10 |
| Channel 2 | 14 |
| Channel 3 | 21 |
| Channel 4 | 26 |
| Channel 5 | 33 |

Since the self potential sonde essentially measures voltages which are of the direct current type, its pickup electrode 35 is directly connected through low pass filter 90 to the cable. The low pass filter not only serves to prevent the power supply voltage from entering electrode 35, but also serves to prevent the transmitted frequency from channel 1 through 5 from being applied to electrode 35. Low pass filter 90 further prevents the voltages from generator 45 and generator 60 from being carried by pickup electrode 35 to conductor 12. Capacitor 41 prevents any direct current signal appearing on conductor 12 from being applied to the power supply or transmitting circuits. It is obvious to one skilled in the art that if filter 42 and 55 have a capacitor input, that capacitor 41 will be superfluous and may be eliminated. Thus, the down hole equipment provides for a novel method of operating the respective sondes simultaneously, and yet, provides means for adequately separating and measuring all the required voltages and currents.

Figure 2:
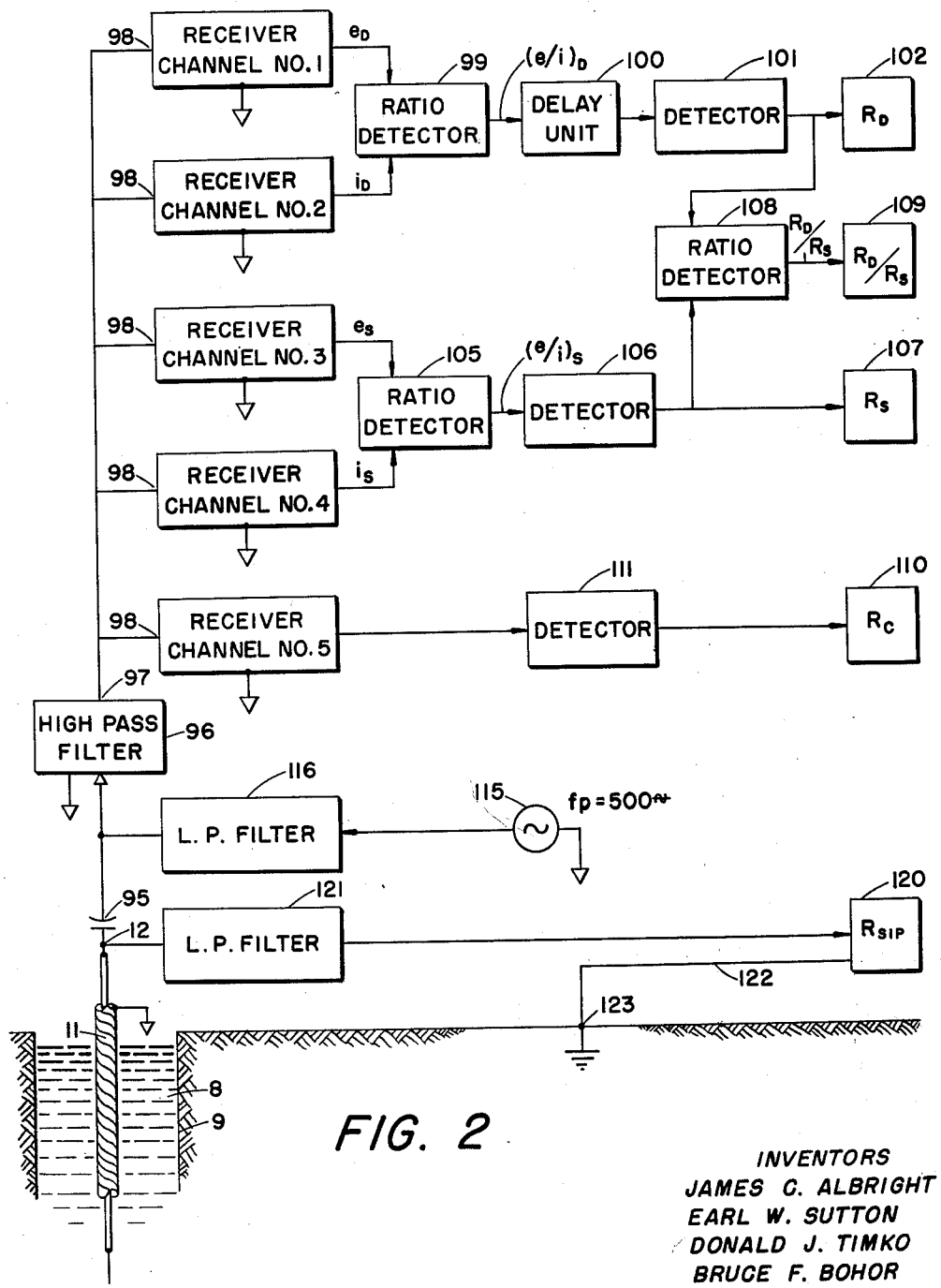
FIGURE 2 is a block diagram of the apparatus used to receive and record the information from the sonde shown in FIGURE 1.
Figure 3:
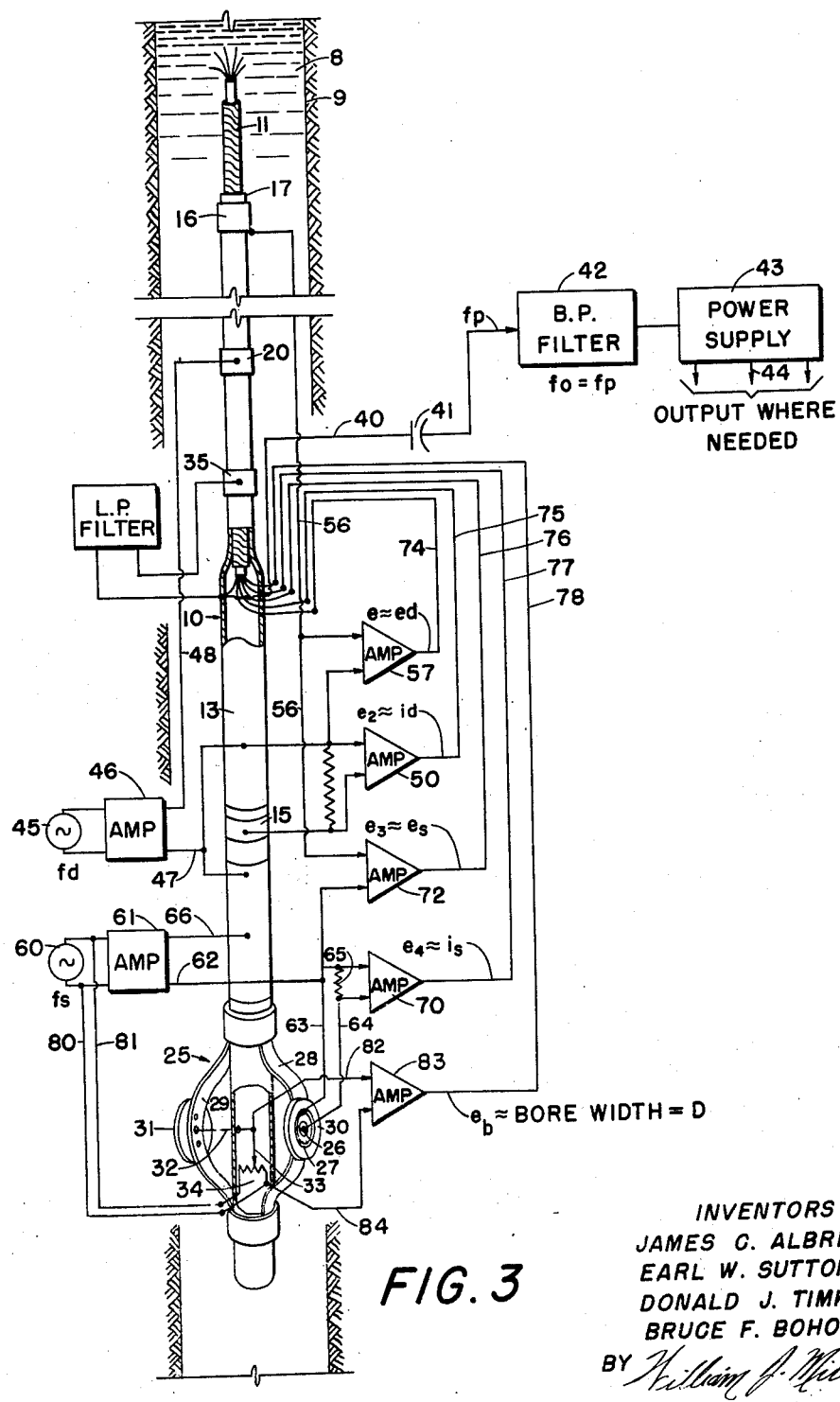
FIGURE 3 is another embodiment of FIGURE 1.

Referring to FIGURE 3, another embodiment of FIGURE 1 is shown. Similar numbers are used for similar components where ever possible. In the event that a multiple cable is used in transmitters channel 1 through channel 5, then matching transformer $T_1$ through $T_5$ and the high pass filter 55 may be eliminated and conductors 74, 75, 76, 77, and 78 may be substituted therefor. The respective amplifiers such as amplifier 57 may also be eliminated for shallow boreholes or where sufficient signal level is obtained without their inclusion. The surface equipment (see FIGURE 2) will also need to be modified to become adaptable to the multiple cable. In this regard, the receivers and high pass filter 96 will be eliminated. In their stead, amplifiers may be substituted as needed. It is obvious by inspection of FIGURE 1 and FIGURE 3 that any combination of the two figures may be employed. For example, any combination of transmitter receivers may be substituted for the cable conductors. It is further obvious that any single additional conductor could be supplied for any single transmitter. The method as described was proposed since a single conductor cable is economically the best choice. It is further apparent that a unique cooperation is provided between the pad-type sonde and the three-element focusing type sonde in that the three-element type sonde furnishes the return current means for the pad-type sonde.

Referring ot FIGURE 2, the surface recording equipment is illustrated. The upper end of cable 11 is shown extending out of borehole 9. A reel or other means of supporting cable 11 is not illustrated. Conductor 12 is connected through a capacitor 95 to the input of a high pass filter 96. An output 97 of high pass filter 96 is connected to the inputs 98 of the receivers for channel 1 through 5. The receivers for channel 1 and channel 2 have their equipment connected to the input of ratio detector 99. The output of the ratio detector is connected to delay unit 100. The delay unit output is connected to a recorder 102 through a detector 101. The outputs of receiver channel 3 and channel 4 are connected to a ratio detector 105. Its output is connected to a detector 106. The output of detector 106 is recorded on recorder 107. The output from detectors 101 and 106 are further connected to a third ratio detector 108, which has its output recorded on recorder 109. The output from channel 5 is connected to recorder 110 through detector 111.

A supply generator 115 for the down hole power supply 43 (see FIGURE 1), is connected to the cable 11 and the input of a low pass filter 116. The low pass filter has its output connected to capacitor 95. The self potential recorder 120 is connected to conductor 12 through a low pass filter 121. Its return path 122 is connected to a remote pick up 123, which may be a ground stake or other similar device. The operation of the equipment may require reference to both FIGURE 2 and FIGURE 1. Generator 115, which may be any suitable type generator of the electronic variety, or motor driven, for example, has its output supplied through a low pass filter to conductor 12. Generator 115 may be any suitable frequency, for example 500 cycles. This generator furnishes the required power for the operation of the down hole equipment. Power supply 42 is designed to operate from generator 115. The low pass filter 116 is inserted primarily to provide a high impedance path to the frequency modulated control signals from the transmitters in the down hole equipment. Capacitor 95 provides isolation for the self potential circuits which were picked up from electrode 35. Recorder 120, which is connected directly to line 12 through low pass filter 121, records the variations in self potential. Low pass filter 121 has a cut off frequency sufficiently low to provide a high impedance path for both $f_p$ and the frequency modulated control signals. Thus, recorder 120 will indicate only variations in self potential. A delay unit (not shown) similar to delay unit 100 may be inserted in the circuit prior to the recorder if depth correlation of the S.P. curve is desired. Other methods such as removing a portion of the record corresponding to the error in depth may be employed also. The various receivers for channel 1 through 5 have their inputs 98 connected to the output 97 of high pass filter 96. High pass filter 96 has a cut off sufficiently above $f_p$ to prevent any power supply voltage from entering the receiver inputs. The receivers making up channel 1 through channel 5 may be any well known form of frequency modulated signal receiver which has sufficient gain and selectivity to differentiate between the various transmitted controlled signals. Each of the receivers, of course, will contain a discriminator, or other well known frequency modulated detecting means, which will reconvert the fluctuations in carrier frequency to corresponding amplified voltage fluctuations. Channel 5 which measures the bore hole diameter, has its output connected directly to a detecting means 111. The output signal from detecting means 111 is recorded on any well known recorder 110, as for example, a photographic or magnetic type recorder. A feature of this invention is the application of the output voltage from channel 1 and channel 2 to a ratio detector. Since channel 1 has an output voltage proportional to $e_d$ and channel 2 has an output voltage proportional to $I_d$, the ratio detector will have an output proportional to $R_d$. This is apparent from Ohm's law, which states that resistance is equal to the voltage/current. The output from ratio detector 99 is then applied to a delay unit 100. Delay unit 100 may have any form of well known delay units, such as a magnetic rotated drum or tape, wherein the recording and pickup heads are operated a discrete distance apart, such that the information will be delayed a length of time proportional to the distance between the three-electrode non-pad focusing sonde and the pad-type sonde. The signal from receivers 3 and 4 which had their outputs proportional to $e_s$ and $I_s$, respectively, are applied to ratio detector 105. It is to be understood that if the pad-type sonde and the non-pad focused sonde are mounted so that their exploratory electrodes 15 and 26 are in the same plane, the delay unit 100 will not be required. The output from ratio detector 105 is thus proportional to $R_s$ or the radiation resistance of the pad-type sonde. A recorder 102 is then used to record the resistance $R_d$ from detector 101. Recorder 107 is likewise used to record $R_s$ from detector 106. However, a third and unique recording is obtained by applying the outputs from detector 101 and detector 106 to a third ratio detector 108. The output from ratio detector 108 divides $R_d$ by $R_s$ and records this value on recorder 109.

The operation of the surface equipment is explained in the following manner.

The self potential which is recorded on recorder 120 is isolated from the signals passing up cable 12 by utilizing low pass filter 121. The cut off frequency of filter 121 is subsequentially below the lowest frequency transmitted either down or up cable 12. In fact, the cut off frequency need be only high enough to pass a very slowly fluctuating D.C. potential. Thus, a cut off frequency of 50 to 100 cycles would be quite adequate. Capacitor 95 isolates any R.C. potential on conductor 12 from the remaining circuit. Generator 115 provides energizing power for the down hole power supply. Low pass filter 116 has a cut off frequency supplied higher than the frequency of generator 115, for example, a frequency of 500 cycles. The cut off frequency of the filter may be 550 cycles. It is to be understood, of course, that the filter could be a band pass filter as well as a low pass filter. The receiving equipment is protected from undesirable signals by high pass filter 96. The signals from channel 1 through channel 5 are applied through conductor 12 to the inputs of receivers channel 1 through channel 5, simultaneously. Since each receiver will be tuned to the frequency of its corresponding transmitter, it will receive only the signal of that transmitter. Channel 5, which records the width of the bore hole, is connected directly to a recording device such as a magnetic recorder. Channel 1 through channel 4, however, are not directly recorded but are combined to form a new and novel record presentation which yields a record with much more identifiable information than has heretofore been recorded. The outputs of channel 1 and channel 2, being the measure of voltage and current respectively from the three-electrode focused pad type sonde, are combined at the input of ratio detector 99 and divided such that the output $e_d/I_d$ will be an indication of the radiation resistance ($R_d$) of the three-electrode non-pad focused type sonde. Channel 3 and channel 4, likewise, are applied to ratio detector such that the output $e_s/I_s$ is equal to the radiation resistance ($R_s$) of the pad-type sonde. Since the three-electrode focused sonde is above the pad-type sonde, it is obvious that they are both not measuring the same portion of the substrata at the same instant, however, both units are physically connected so that a finite time will exist between the time the three-element sonde would measure a particular strata and the time the pad-type sonde would measure the same strata, the time being determined by the distance between the sondes. A delay unit 100 is provided to insert the delay in the voltage from ratio detector 99; the voltages are then detected in the usual manner to detector 101 and 106 and recorded in recorders 102 and 107. While recordings 102 and 107 would provide information pertaining to the radiation resistance of a corresponding piece of subterranean strata, a method for pinpointing a subterranean strata capable of trapping hydrocarbon deposits is still desired. Referring to FIGURE 4B, a graph is shown of resistance $R_d$ versus depth for the three-electrode non-pad focused type sonde. FIGURE 4C, likewise, shows a graph of $R_s$ versus the same depth as FIGURE 4B. FIGURE 4A illustrates possible formations in the depth illustrated in the graphs of FIGURES 4B and 4C. Upon inspection of both FIGURES 4B and 4C, it is evident that a careful study must be made of both figures simultaneously in order to get some indication of the hydrocarbon formations. For example, at 1050 feet a formation bearing oil, sand, and water is shown. However, the oil bearing formation appears only slightly upon examining FIGURE 4B and FIGURE 4C. FIGURE 4B reveals a certain percentage of porosity between 1050 feet and 1072 feet. Likewise, the pad-type sonde showed a slight decrease in resistance during that time. However, to an observer not skilled in the art, the changes were only very slight. Further observations of FIGURES 4B and 4C at points 130 and 131, show a variation in the resistance of the respective sondes. Likewise, at 132 and 133, a variation in the resistance indicated that FIGURES 4B and 4C is shown. These changes, likewise, would not be so apparent to one less skilled in the art. To cause these slight variations in resistance to readily stand out and be extremely prominent, the output from detectors 101 and 106 are applied to a third ratio detector 108. The output voltage from detector 108 represents the division of the resistance $R_d$ of the three-electrode focused sonde by the resistance $R_s$ of the pad-type sonde. The voltage thus obtained will cause a dramatic presentation of the formations that are possible hydrocarbon reservoirs. The output from ratio detector 108 which is recorded on 109 is illustrated in FIGURE 4D. Here, it is evident that at 135 a possible hydrocarbon reservoir is located at 1050 feet. Indications of further hydrocarbons are illustrated at 136 and 137. The record thus produced presents a very clear picture which will greatly reduce the tedious examination time required for a lengthy record.

Thus, a system has been disclosed which provides an exact correlation between various logging sondes which has heretofore been impossible. It further eliminates the extreme difficulties in accounting for cable stretch and other well known causes for correlation difficulties in logging a well.

Although this invention has been described with respect to particular embodiments thereof, it is not to be so limited, as changes and modifications may be made therein which are within the spirit and scope of the invention as defined by the appended claims.

We claim:

1. A method of recording a plurality of received voltages of a plurality of simultaneously operated electrical logging sondes comprising, receiving a first and second signal from a first sonde, said first and second signals corresponding to the received voltages and transmitted currents respectively, forming a first ratio from the ratio of said first and second voltages, receiving third and fourth voltages, said third and fourth voltages corresponding to the received voltage and transmitted current of a second sonde respectively forming a second ratio voltage corresponding to the ratio of said third and fourth voltages, adjusting the time synchronism of said first and second ratio voltages in correspondence to the difference in depth of said first and second sondes, forming a third ratio voltage by obtaining a ratio of said first and second ratio voltages and recording said third ratio voltage in time synchronism with the position of said sondes.

2. A recording method as claimed in claim 1 and further particularized in that said first and second ratio voltages are recorded in time synchronism with the movement of said sonde.

3. A method as described in claim 1 and further particularized in that the first and second ratio voltages are adjusted in time synchronism by causing one of said voltages to be delayed in time corresponding to the difference in depth of said first and second sondes.

4. An apparatus for recording the output from a plurality of simultaneously operated formation resistance measuring sondes having a fixed depth relation to each other comprising means for separating each of the outputs from each of said resistance sondes, a first ratio detecting means receiving the output voltages which are proportional to the voltage and current from said first sonde, a second ratio detecting means receiving the output voltages which are proportional to the voltage and current from said second sonde, a third ratio detecting means receiving the output voltages from said first and second ratio detecting means, and means for recording the output from said third ratio detecting means.

5. An apparatus as described in claim 4 and further particularized in that said means for separating each of the outputs from each of said resistance sondes comprises a plurality of individual wires connected through said cable to said sonde outputs.

6. An apparatus as described in claim 4 wherein the means for separating each of the outputs of each of said resistance sondes comprises a plurality of selective networks.

7. An apparatus as described in claim 4 and having a time delay means, said time delay means operating on said received voltages such that said received voltages will be in time synchronism with identical strata within a borehole.

References Cited in the file of this patent

UNITED STATES PATENTS

| | | |
|---|---|---|
| 2,436,503 | Cleveland | Feb. 24, 1948 |
| 2,446,303 | Owen | Aug. 3, 1948 |
| 2,573,133 | Greer | Oct. 30, 1951 |
| 2,653,294 | McMillan | Sept. 22, 1953 |
| 2,707,768 | Owen | May 3, 1955 |
| 2,712,631 | Ferre | July 5, 1955 |